United States Patent
Sato et al.

(10) Patent No.: US 10,361,440 B2
(45) Date of Patent: Jul. 23, 2019

(54) ELECTROCHEMICAL REACTION UNIT HAVING A SINGLE CELL INCLUDING A CURRENT COLLECTOR HAVING A PROTRUSION COATED WITH AN ELECTRICALLY CONDUCTIVE COAT IN CONTACT WITH A CATHODE VIA A BONDING LAYER AND FUEL CELL STACK

(71) Applicant: NGK SPARK PLUG CO., LTD., Nagoya-shi, Aichi (JP)

(72) Inventors: Yoshiaki Sato, Komaki (JP); Makoto Kuribayashi, Ichinomiya (JP); Tomoki Murata, Komaki (JP); Takahiro Masumoto, Komaki (JP); Tomoo Tanaka, Kitanagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 15 days.

(21) Appl. No.: 15/561,263

(22) PCT Filed: Mar. 23, 2016

(86) PCT No.: PCT/JP2016/059215
§ 371 (c)(1),
(2) Date: Sep. 25, 2017

(87) PCT Pub. No.: WO2016/152924
PCT Pub. Date: Sep. 29, 2016

(65) Prior Publication Data
US 2018/0123143 A1  May 3, 2018

(30) Foreign Application Priority Data
Mar. 26, 2015  (JP) .................. 2015-064524

(51) Int. Cl.
*H01M 8/0247* (2016.01)
*H01M 8/2425* (2016.01)
(Continued)

(52) U.S. Cl.
CPC .......... *H01M 8/0247* (2013.01); *H01M 8/02* (2013.01); *H01M 8/0202* (2013.01); *H01M 8/12* (2013.01);
(Continued)

(58) Field of Classification Search
CPC .......... H01M 2008/1293; H01M 8/02; H01M 8/0202; H01M 8/0228; H01M 8/0245;
(Continued)

(56) References Cited

U.S. PATENT DOCUMENTS

| | | | | |
|---|---|---|---|---|
| 2008/0299435 A1* | 12/2008 | Imura | ............... | H01M 8/0247 429/413 |
| 2009/0004524 A1* | 1/2009 | Wang | ............... | H01M 8/0247 429/454 |

(Continued)

FOREIGN PATENT DOCUMENTS

| | | |
|---|---|---|
| JP | 2008-293843 A | 12/2008 |
| JP | 2010-157387 A | 7/2010 |

(Continued)

OTHER PUBLICATIONS

International Search Report, issued by International Searching Authority in corresponding International Application No. PCT/JP2016/059215, dated Jun. 14, 2016, (PCT/ISA/210).

*Primary Examiner* — Imran Akram
(74) *Attorney, Agent, or Firm* — Sughrue Mion, PLLC

(57) ABSTRACT

An electrochemical reaction unit containing a single cell including an electrolyte layer containing solid oxide, and a cathode and an anode which face each other in a first direction with the electrolyte layer intervening therebe-
(Continued)

tween; a current collector disposed on a cathode side of the single cell and having a protrusion protruding toward the cathode; an electrically conductive coat covering a surface of the current collector; and an electrically conductive bonding layer bonding the cathode and the protrusion covered with the coat. In at least one section of the protrusion taken in parallel with the first direction, the protrusion covered with the coat has a covered portion covered with the bonding layer and an exposed portion exposed from the bonding layer and including a corner portion of the protrusion covered with the coat.

10 Claims, 11 Drawing Sheets

(51) Int. Cl.

| | | |
|---|---|---|
| *H01M 8/1246* | (2016.01) | |
| *H01M 8/12* | (2016.01) | |
| *H01M 8/24* | (2016.01) | |
| *H01M 8/02* | (2016.01) | |
| *H01M 8/0202* | (2016.01) | |
| *H01M 8/124* | (2016.01) | |

(52) U.S. Cl.
CPC ........... *H01M 8/1246* (2013.01); *H01M 8/24* (2013.01); *H01M 8/2425* (2013.01); *H01M 2008/1293* (2013.01); *Y02E 60/366* (2013.01); *Y02E 60/525* (2013.01); *Y02P 70/56* (2015.11)

(58) Field of Classification Search
CPC ............. H01M 8/0247; H01M 8/0254; H01M 8/1246; H01M 8/2425; Y10T 428/12056; Y10T 428/1259; Y10T 428/24975
See application file for complete search history.

(56) References Cited

U.S. PATENT DOCUMENTS

| | | | |
|---|---|---|---|
| 2010/0183952 A1* | 7/2010 | Amarasinghe | H01M 8/0215 429/514 |
| 2011/0111327 A1 | 5/2011 | Ohmori et al. | |
| 2011/0236785 A1* | 9/2011 | Imura | H01M 8/2418 429/479 |
| 2012/0034541 A1* | 2/2012 | Muraoka | H01M 8/0215 429/456 |
| 2014/0178795 A1 | 6/2014 | Kim et al. | |
| 2015/0056537 A1* | 2/2015 | Yagi | H01M 8/0247 429/495 |
| 2015/0155571 A1* | 6/2015 | Higashi | H01M 8/0208 429/468 |

FOREIGN PATENT DOCUMENTS

| | | | | |
|---|---|---|---|---|
| JP | 2011-9065 A | 1/2011 | | |
| JP | 2011-99159 A | 5/2011 | | |
| JP | 2013-239330 A | 11/2013 | | |
| JP | 2014-41705 A | 3/2014 | | |
| JP | 2014-123544 A | 7/2014 | | |
| JP | 2015-28889 A | 2/2015 | | |
| WO | WO-2013172451 A1 * | 11/2013 | .......... H01M 8/0228 |

* cited by examiner

ELECTROCHEMICAL REACTION UNIT HAVING A SINGLE CELL INCLUDING A CURRENT COLLECTOR HAVING A PROTRUSION COATED WITH AN ELECTRICALLY CONDUCTIVE COAT IN CONTACT WITH A CATHODE VIA A BONDING LAYER AND FUEL CELL STACK

TECHNICAL FIELD

A technique disclosed in the present specification relates to an electrochemical reaction unit.

BACKGROUND ART

A known type of a fuel cell for generating electricity by utilizing electrochemical reaction between hydrogen and oxygen is a solid oxide fuel cell (hereinafter, also called "SOFC") which has electrolyte layers containing solid oxide. A fuel cell electricity generation unit (hereinafter, may be called merely "electricity generation unit"), which is the smallest unit of electricity generation of SOFC, has a single cell which includes an electrolyte layer and mutually facing cathode and anode with the electrolyte layer intervening therebetween, and electrically conductive current collectors disposed respectively on a cathode side and on an anode side of the single cell and adapted to collect electricity generated in the single cell. Generally, the current collector disposed on the cathode side of the single cell has protrusions protruding toward the cathode. The cathode and the protrusions of the current collector are bonded together by an electrically conductive bonding layer, whereby the cathode and the current collector are electrically connected.

The current collector disposed on the cathode side of the single cell is formed of, for example, a metal which contains Cr (chromium), such as ferritic stainless steel. When such a current collector is exposed to an atmosphere of a high temperature of, for example, 700° C. to 1,000° C. in the course of operation of SOFC, there may arise a phenomenon called "Cr diffusion" in which Cr is emitted from the surface of the current collector and diffused. When Cr emitted from the current collector enters the bonding layer, unfavorably, the emitted Cr reacts with a component of the bonding layer to thereby cause deterioration in electric conductivity of the bonding layer, or passes through the bonding layer to reach the interface with the cathode, causing a phenomenon called "Cr poisoning of cathode" in which the electrode reaction rate in the cathode deteriorates. In order to restrain Cr diffusion from the current collector, there is known a technique in which the surface of the current collector is covered with an electrically conductive coat (see, for example, Patent Document 1).

PRIOR ART DOCUMENT

Patent Document

Patent Document: Japanese Patent Application Laid-Open (kokai) No. 2011-99159

SUMMARY OF THE INVENTION

Problem to be Solved by the Invention

A corner portion of the protrusion of the current collector has a larger number of surfaces as compared with the other portion of the protrusion. Also, the thickness of a coat which covers the protrusion is apt to become thin at the corner portion. As a result, Cr diffusion is more likely to occur at the corner portion of the protrusion of the current collector than at the other portion of the protrusion. Accordingly, in the vicinity of the corner portion of the protrusion of the current collector, deterioration in electric conductivity of the bonding layer and in electrode reaction rate of the cathode is apt to occur as a result of entry of Cr emitted from the protrusion into the bonding layer. The above-mentioned conventional technique fails to sufficiently restrain such a deterioration in electric conductivity of the bonding layer and in electrode reaction rate of the cathode.

Such a problem is common with an electrolysis cell unit, which is the smallest unit of a solid oxide electrolysis cell (hereinafter, may be called "SOEC") for generating hydrogen by utilizing electrolysis of water. In the present specification, an electricity generation unit and an electrolysis cell unit are collectively called an electrochemical reaction unit.

The present specification discloses a technique capable of solving the above problem.

Means for Solving the Problem

A technique disclosed in the present specification can be implemented, for example, in the following modes.

(1) An electrochemical reaction unit disclosed in the present specification comprises a single cell including an electrolyte layer containing solid oxide, and a cathode and an anode which face each other in a first direction with the electrolyte layer intervening therebetween; a current collector disposed on a cathode side of the single cell and having a protrusion protruding toward the cathode; an electrically conductive coat covering a surface of the current collector; and an electrically conductive bonding layer bonding the cathode and the protrusion covered with the coat. The electrochemical reaction unit is characterized in that in at least one section of the protrusion taken in parallel with the first direction, the protrusion covered with the coat has a covered portion covered with the bonding layer and an exposed portion exposed from the bonding layer and including a corner portion of the protrusion covered with the coat. According to the present electrochemical reaction unit, although Cr is apt to be emitted from the corner portion of the protrusion of the current collector because of large surface area and susceptibility to thinning of the coat, entry into the bonding layer of Cr emitted from the corner portion of the protrusion can be restrained, whereby deterioration in electric conductivity of the bonding layer and in electrode reaction rate of the cathode can be effectively restrained.

(2) The above electrochemical reaction unit may be configured such that in all sections of the protrusion taken in parallel with the first direction, the protrusion covered with the coat has the covered portion and the exposed portion. According to the present electrochemical reaction unit, entry into the bonding layer of Cr emitted from the corner portion of the protrusion of the current collector can be more effectively restrained, whereby deterioration in electric conductivity of the bonding layer and in electrode reaction rate of the cathode can be more effectively restrained.

(3) The above electrochemical reaction unit may be configured such that the current collector has a plurality of the protrusions and such that in all sections of each of the plurality of protrusions taken in parallel with the first direction, the protrusion covered with the coat has the covered portion and the exposed portion. According to the present electrochemical reaction unit, regarding each of the plurality of protrusions, entry into the bonding layer of Cr emitted from the corner portion of the protrusion can be more effectively restrained, whereby deterioration in electric conductivity of the bonding layer and in electrode reaction rate of the cathode can be more effectively restrained.

(4) The above electrochemical reaction unit may be configured such that a contact area of the bonding layer with the cathode is smaller than a contact area of the bonding layer with the protrusion covered with the coat. According to the present electrochemical reaction unit, the bonding layer's hindrance to gas diffusion into the cathode can be restrained, whereby deterioration in electricity generation performance can be restrained.

(5) The above electrochemical reaction unit may be configured such that a contact area of the bonding layer with the cathode is greater than a contact area of the bonding layer with the protrusion covered with the coat. According to the present electrochemical reaction unit, the contact area between the bonding layer and the cathode can be increased, whereby deterioration in electric conductivity of the bonding layer can be more effectively restrained. Also, according to the present electrochemical reaction unit, the reaction interface of the cathode which receives electrons is increased, whereby electricity generation performance can be improved.

(6) The above electrochemical reaction unit may be configured such that the bonding layer is formed of a spinel oxide. According to the present electrochemical reaction unit, even though Cr emitted from the corner portion of the protrusion enters the bonding layer, an increase in resistance caused by Cr can be restrained to a low level as compared with a structure in which the bonding layer is formed of another material such as a perovskite-type oxide, whereby deterioration in electric conductivity of the bonding layer can be more effectively restrained.

(7) The above electrochemical reaction unit may be configured such that the bonding layer is formed of a spinel oxide which contains at least one of Zn, Mn, Co, and Cu. According to the present electrochemical reaction unit, since a spinel oxide which contains at least one of Zn, Mn, Co, and Cu can maintain a spinel structure for a long period of time even in a relatively high temperature environment, as a result of the bonding layer being formed of such a spinel oxide, the effect of restraining deterioration in electric conductivity of the bonding layer can be maintained for a long period of time.

The technique disclosed in the present specification can be implemented in various modes; for example, a fuel cell electricity generation unit, a fuel cell stack having a plurality of fuel cell electricity generation units, an electricity generation module having a fuel cell stack, a fuel cell system having an electricity generation module, an electrolysis cell unit, an electrolysis cell stack having a plurality of electrolysis cell units, a hydrogen generation module having an electrolysis cell stack, and a hydrogen generation system having a hydrogen generation module.

MODES FOR CARRYING OUT THE INVENTION

A. First Embodiment

A-1. Basic Structure of Apparatus
(Structure of Fuel Cell Stack 100)

Figure 1:
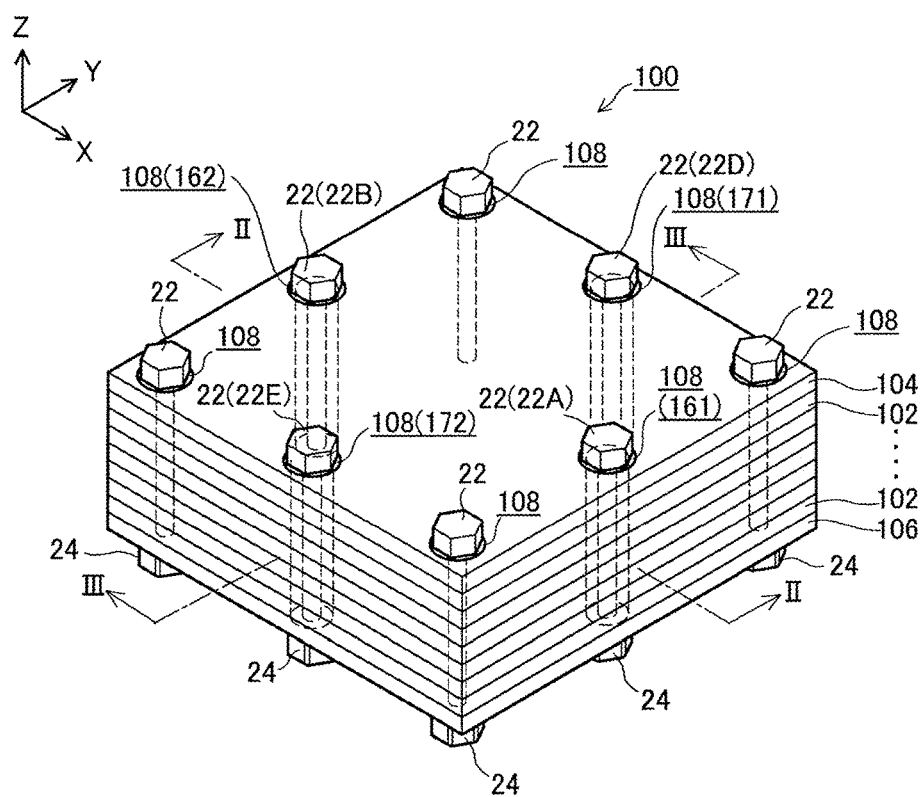
FIG. 1 Perspective view schematically showing the external appearance of a fuel cell stack 100.

FIG. 1 is a perspective view schematically showing the external appearance of a fuel cell stack 100. FIG. 1 shows mutually orthogonal X-axis, Y-axis, and Z-axis for specifying orientation. In the present specification, for convenience, the positive Z-axis direction is called the upward direction, and the negative Z-axis direction is called the downward direction; however, the fuel cell stack 100 may be disposed in a different orientation. The same also applies to FIG. 2 and subsequent drawings.

The fuel cell stack 100 includes a plurality of fuel cell electricity generation units (hereinafter, may be called merely the "electricity generation units") 102 disposed in a predetermined direction of array (in the vertical direction in the present embodiment) and a pair of end plates 104 and 106 disposed in such a manner as to hold the plurality of electricity generation units 102 from the vertical direction. The number of the electricity generation units 102 contained in the fuel cell stack 100 shown in FIG. 1 is a mere example and is determined as appropriate in accordance with a required output voltage of the fuel cell stack 100, etc. The direction of array (vertical direction) corresponds to the first direction.

The fuel cell stack 100 has a plurality of (eight in the present embodiment) through holes 108 formed in a peripheral portion about the Z-axis direction and extending therethrough in the vertical direction from the upper end plate 104 to the lower end plate 106. The constituent layers of the fuel cell stack 100 are clamped and fixed together by means of bolts 22 inserted through the respective through holes 108 and nuts 24 engaged with the bolts 22.

The outside diameter of a shaft portion of each bolt 22 is smaller than the inside diameter of each through hole 108. Accordingly, a space exists between the outer circumferential surface of the shaft portion of each bolt 22 and the inner circumferential surface of each through hole 108. A space defined by the bolt 22 (bolt 22A) and the through hole 108 located at around the midpoint of one side of the perimeter about the Z-axis direction of the fuel cell stack 100 (a side on the positive side of the X-axis direction of two sides in parallel with the Y-axis) functions as an oxidizer gas supply manifold 161 for supplying oxidizer gas (represented by "OG" in the drawings) to the electricity generation units 102, whereas a space defined by the bolt 22 (bolt 22B) and the through hole 108 located at around the midpoint of the other side opposite the above side (a side on the negative side of the X-axis direction of two sides in parallel with the Y-axis) functions as an oxidizer gas discharge manifold 162 for discharging unreacted oxidizer gas (hereinafter, called "oxidizer offgas," and represented by "OOG" in the drawings) from the electricity generation units 102 (see FIG. 2). A space defined by the bolt 22 (bolt 22D) and the through hole 108 located at around the midpoint of the other side of the perimeter about the Z-axis direction of the fuel cell stack 100 (a side on the positive side of the Y-axis direction of two sides in parallel with the X-axis) functions as a fuel gas supply manifold 171 for supplying fuel gas (represented by "FG" in the drawings) to the electricity generation units 102, whereas a space defined by the bolt 22 (bolt 22E) and the through hole 108 located at around the midpoint of the other side opposite the above side (a side on the negative side of the Y-axis direction of two sides in parallel with the X-axis) functions as a fuel gas discharge manifold 172 for discharging unreacted fuel gas (hereinafter, called "fuel offgas," and represented by "OFG" in the drawings) from the electricity generation units 102. In the present embodiment, for example, air is used as oxidizer gas, and hydrogen-rich gas reformed from city gas is used as fuel gas.

(Structure of End Plates 104 and 106)

The two end plates 104 and 106 are electrically conductive members each having a quadrate flat-plate shape and are formed of, for example, stainless steel. The end plates 104 and 106 have holes formed in their peripheral portions about the Z-axis and corresponding to the through holes 108 into which the above-mentioned bolts 22 are inserted respectively. One end plate 104 is disposed on the uppermost electricity generation unit 102, and the other end plate 106 is disposed under the lowermost electricity generation unit 102. A plurality of the electricity generation units 102 are held under pressure between the two end plates 104 and 106. The upper end plate 104 (or another member connected to the upper end plate 104) functions as a positive output terminal of the fuel cell stack 100, and the lower end plate 106 (or another member connected to the lower end plate 106) functions as a negative output terminal of the fuel cell stack 100.

(Structure of Electricity Generation Unit 102)

Figure 2:
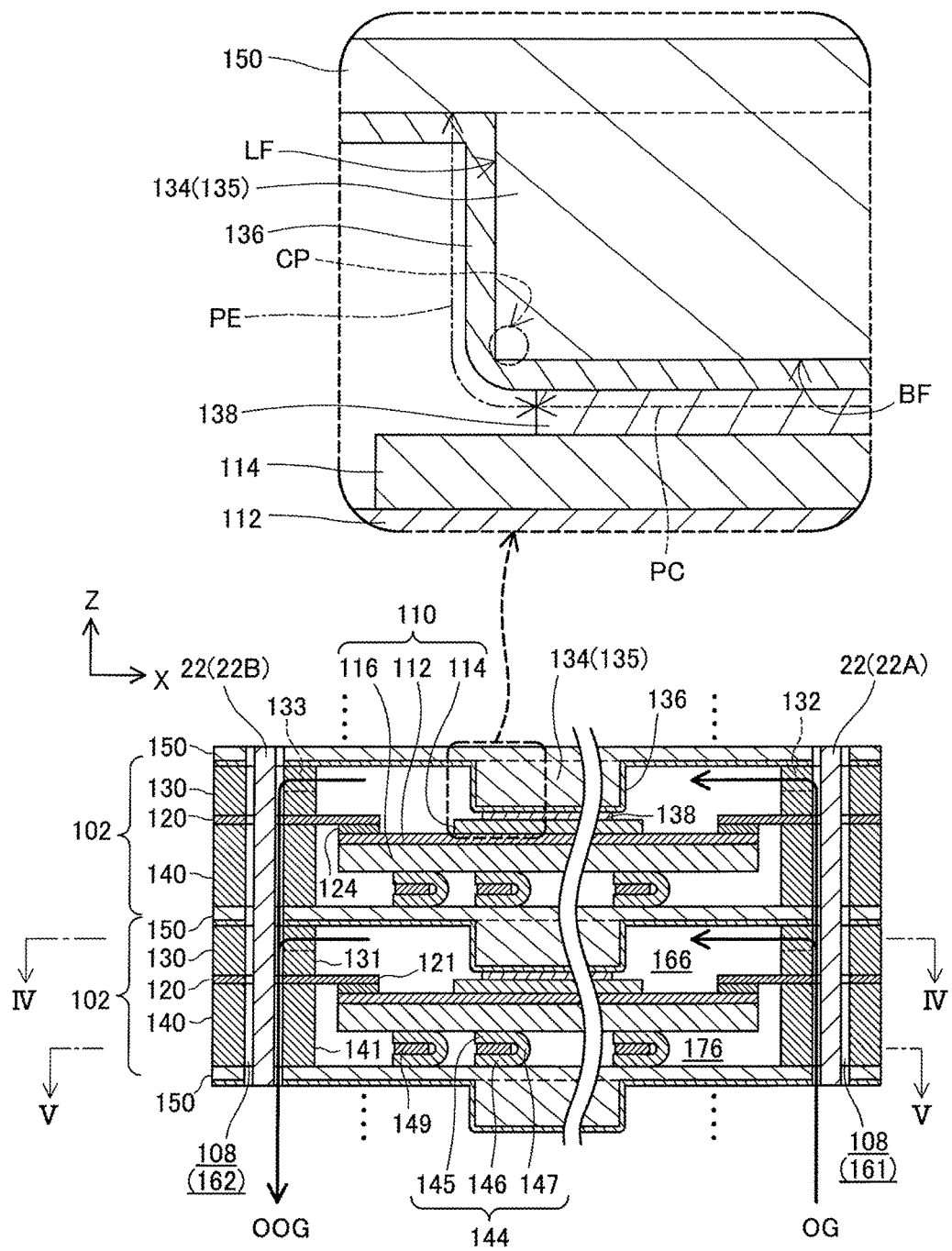
FIG. 2 Explanatory view (XZ section) schematically showing the structure of an electricity generation unit 102.
Figure 3:
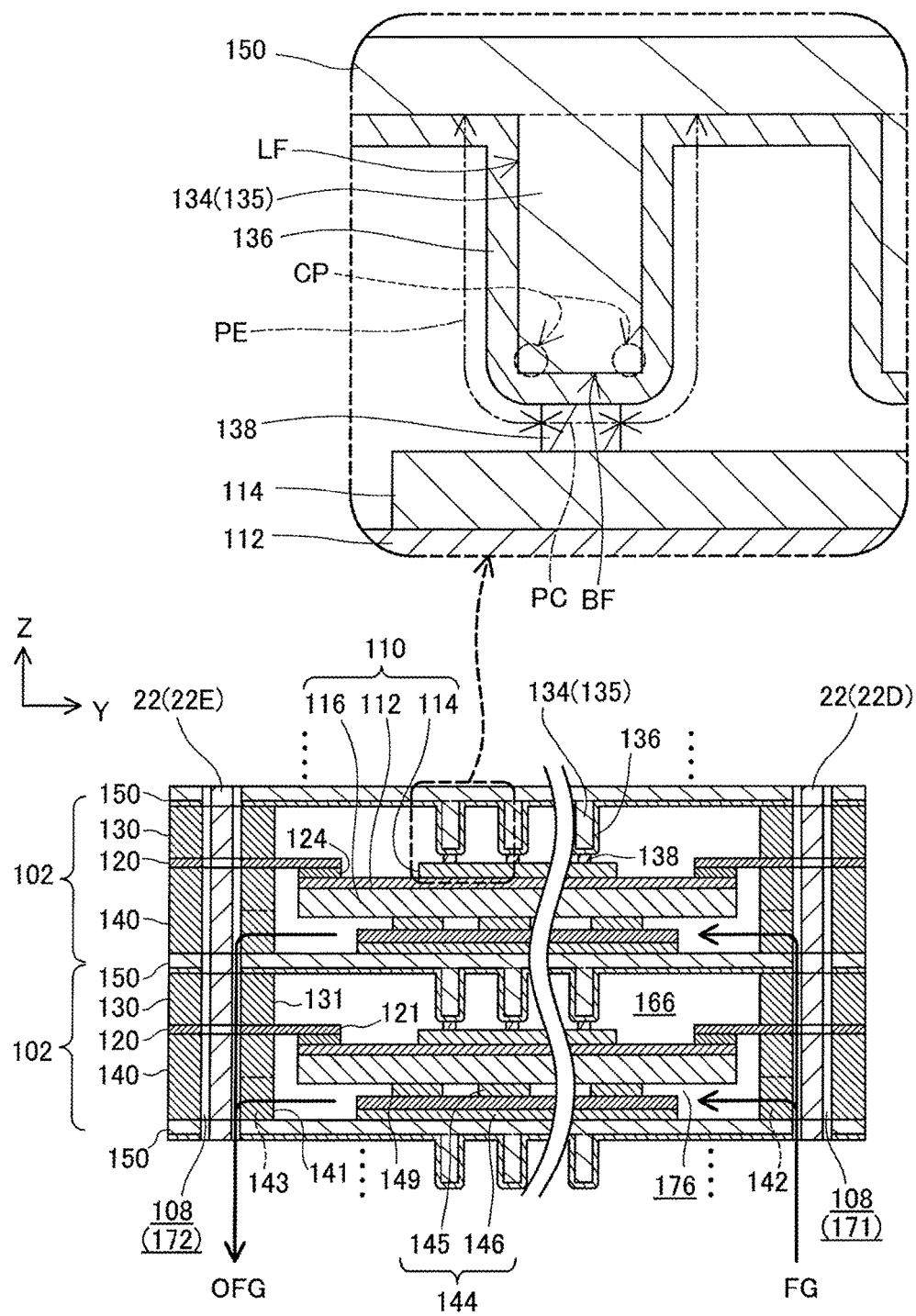
FIG. 3 Explanatory view (YZ section) schematically showing the structure of the electricity generation unit 102.
Figure 4:
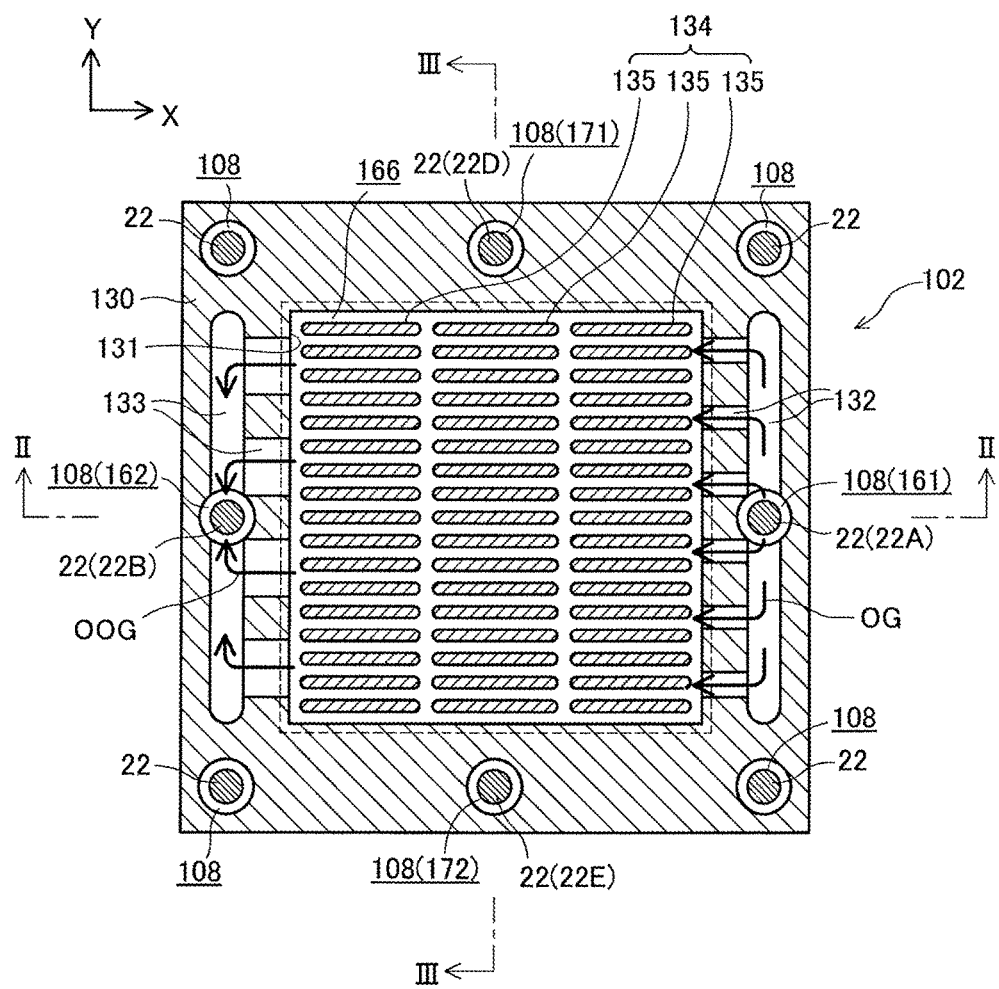
FIG. 4 Explanatory view (XY section) schematically showing the structure of the electricity generation unit 102.
Figure 5:
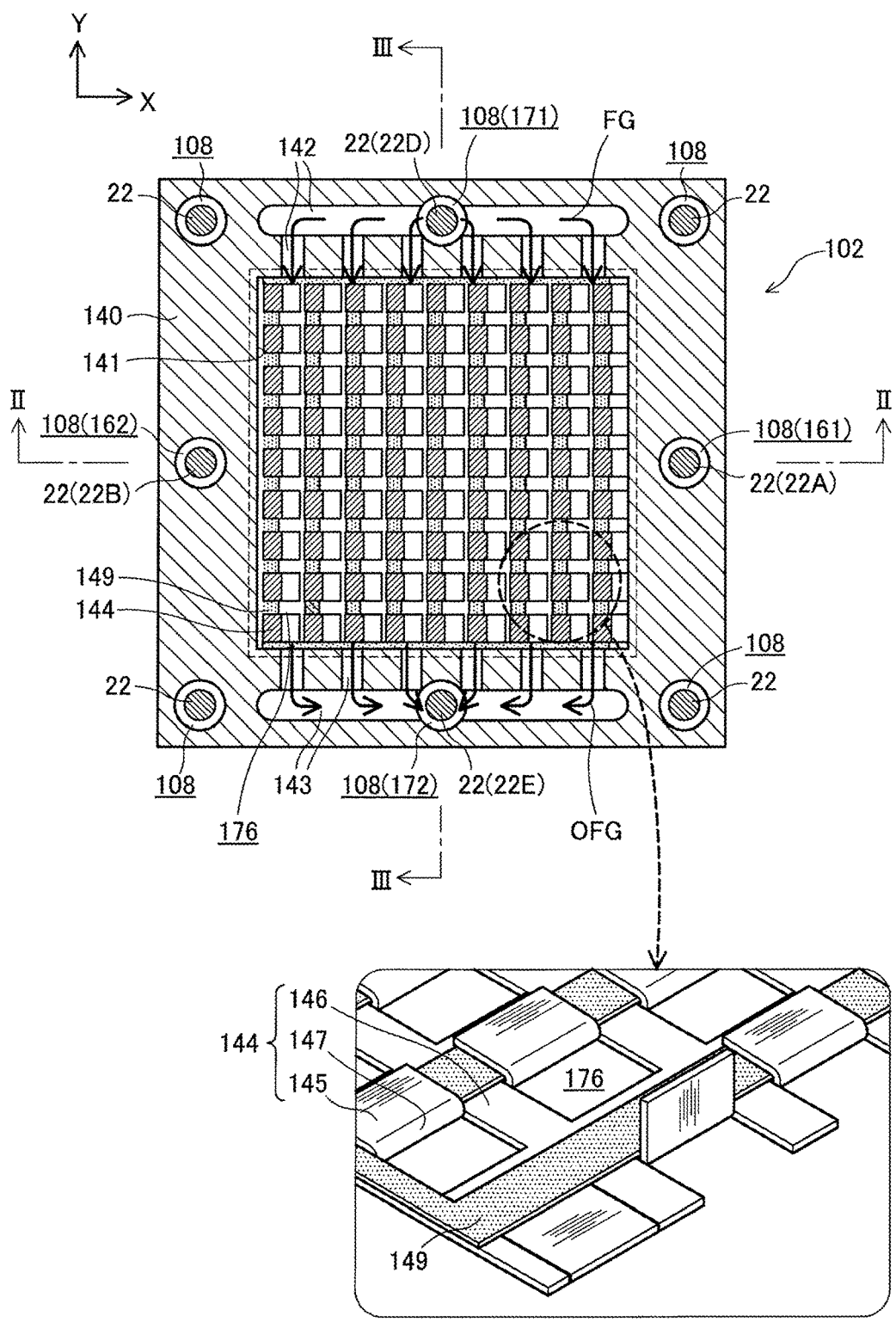
FIG. 5 Explanatory view (XY section) schematically showing the structure of the electricity generation unit 102.

FIGS. 2 to 5 are explanatory views schematically showing the structure of the electricity generation unit 102. FIG. 2 shows the sectional structure of the electricity generation unit 102 taken along the line II-II of FIGS. 1, 4, and 5; FIG. 3 shows the sectional structure of the electricity generation unit 102 taken along the line III-III of FIGS. 1, 4, and 5; FIG. 4 shows the sectional structure of the electricity generation unit 102 taken along the line IV-IV of FIG. 2; and FIG. 5 shows the sectional structure of the electricity generation unit 102 taken along the line V-V of FIG. 2. Notably, each of FIGS. 2 and 3 shows the section of a portion on an enlarged scale.

As shown in FIGS. 2 and 3, the electricity generation unit 102 serving as the smallest unit of electricity generation includes a single cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. The separators 120, the cathode-side frames 130, the anode-side frames 140, and the interconnectors 150 have holes formed in their peripheral portions about the Z-axis and corresponding to the through holes 108 into which the above-mentioned bolts 22 are inserted respectively.

The interconnector 150 is an electrically conductive member having a quadrate flat-plate shape and is formed of, for example, a metal which contains Cr (chromium), such as ferritic stainless steel. The interconnector 150 secures electrical conductivity between the electricity generation units 102 and prevents mixing of gases between the electricity generation units 102. Two electricity generation units 102 share one interconnector 150. Specifically, the upper interconnector 150 of a certain electricity generation unit 102 serves as a lower interconnector 150 of the upper adjacent electricity generation unit 102. Also, since the fuel cell stack 100 has the two end plates 104 and 106, the upper interconnector 150 of the uppermost electricity generation unit 102 and the lower interconnector 150 of the lowermost electricity generation unit 102 can be eliminated.

The single cell 110 includes an electrolyte layer 112, and a cathode 114 and an anode 116 which face each other in the vertical direction with the electrolyte layer 112 intervening therebetween. The single cell 110 of the present embodiment is an anode-support-type single cell in which the anode 116 supports the electrolyte layer 112 and the cathode 114.

The electrolyte layer 112 is a member having a quadrate flat-plate shape and is formed of a solid oxide; for example, YSZ (yttria-stabilized zirconia), ScSZ (scandia-stabilized zirconia), SDC (samarium-doped ceria), GDC (gadolinium-doped ceria), or a perovskite-type oxide. The cathode 114 is a member having a quadrate flat-plate shape and smaller in size than the electrolyte layer 112 as viewed in the X-Y plane and is formed of, for example, a perovskite-type oxide (e.g., LSCF (lanthanum strontium cobalt ferrite), LSM (lanthanum strontium manganese oxide), or LNF (lanthanum nickel ferrite)). The anode 116 is a member having a quadrate flat-plate shape and identical in size to the electrolyte layer 112 as viewed in the X-Y plane and is formed of, for example, Ni (nickel), a cermet of Ni and ceramic powder, or an Ni-based alloy. Thus, the single cell 110 of the present embodiment is a solid oxide fuel cell (SOFC) including the electrolyte layer 112 which contains a solid oxide.

The separator 120 is a frame member which has a quadrate through hole 121 formed in a central region thereof, and is formed of, for example, a metal. A portion of the separator 120 around the through hole 121 faces a peripheral portion of the surface on the cathode 114 side of the electrolyte layer 112. The separator 120 is bonded to the electrolyte layer 112 (single cell 110) by means of a bonding member 124 formed of a brazing material (e.g., Ag solder)

and disposed between the facing portion and the electrolyte layer 112. The separator 120 separates the air chamber 166 which faces the cathode 114, and the fuel chamber 176 which faces the anode 116, from each other, thereby restraining gas leakage from one electrode side to the other electrode side. The single cell 110 to which the separator 120 is bonded is also called a separator-attached single cell.

As shown in FIGS. 2 to 4, the cathode-side frame 130 is a frame member which has a quadrate through hole 131 formed in a central region thereof and, and is formed of, for example, an insulator such as mica. The cathode-side frame 130 is in contact with a peripheral portion of the surface on a side opposite the electrolyte layer 112 of the separator 120 and with a peripheral portion of the surface on a side toward the cathode 114 of the interconnector 150. The cathode-side frame 130 secures the air chamber 166 between the cathode 114 and the interconnector 150 and electrically insulates the two interconnectors 150 contained in the electricity generation unit 102 from each other. Also, the cathode-side frame 130 has an oxidizer gas supply communication hole 132 formed therein and adapted to establish communication between the oxidizer gas supply manifold 161 and the air chamber 166, and an oxidizer gas discharge communication hole 133 formed therein and adapted to establish communication between the air chamber 166 and the oxidizer gas discharge manifold 162.

As shown in FIGS. 2, 3, and 5, the anode-side frame 140 is a frame member which has a quadrate through hole 141 formed in a central region thereof, and is formed of, for example, a metal. The anode-side frame 140 is in contact with a peripheral portion of the surface on a side toward the electrolyte layer 112 of the separator 120 and with a peripheral portion of the surface on a side toward the anode 116 of the interconnector 150. The anode-side frame 140 secures the fuel chamber 176 between the anode 116 and the interconnector 150. Also, the anode-side frame 140 has a fuel gas supply communication hole 142 formed therein and adapted to establish communication between the fuel gas supply manifold 171 and the fuel chamber 176, and a fuel gas discharge communication hole 143 formed therein and adapted to establish communication between the fuel chamber 176 and the fuel gas discharge manifold 172.

As shown in FIGS. 2, 3, and 5, the anode-side current collector 144 is disposed within the fuel chamber 176. The anode-side current collector 144 includes an interconnector facing portion 146, a plurality of electrode facing portions 145, and connection portions 147 which connect the electrode facing portions 145 and the interconnector facing portion 146, and is formed of, for example, nickel, a nickel alloy, stainless steel, or the like. Specifically, the anode-side current collector 144 is manufactured by making cuts in a member having a quadrate flat-plate shape and then raising and bending a plurality of quadrate portions. The raised and bent quadrate portions become the electrode facing portions 145; a holed flat-plate portion other than the raised and bent portions becomes the interconnector facing portion 146; and portions which connect the electrode facing portions 145 and the interconnector facing portion 146 become the connection portions 147. The enlarged partial view in FIG. 5 shows a state before completion of the work of raising and bending some quadrate portions in order to show the method of manufacturing the anode-side current collector 144. The electrode facing portions 145 are in contact with the surface on a side opposite the electrolyte layer 112 of the anode 116, and the interconnector facing portion 146 is in contact with the surface on a side toward the anode 116 of the interconnector 150. As a result, the anode-side current collector 144 electrically connects the anode 116 and the interconnector 150. In the present embodiment, a spacer 149 formed of, for example, mica is disposed between the electrode facing portions 145 and the interconnector facing portion 146. As a result, the anode-side current collector 144 follows the deformation of the electricity generation unit 102 stemming from a temperature cycle and a pressure variation of reaction gas, thereby maintaining good electrical connection through the anode-side current collector 144 between the anode 116 and the interconnector 150.

As shown in FIGS. 2 to 4, the cathode-side current collector 134 is disposed within the air chamber 166. The cathode-side current collector 134 is composed of a plurality of current collector elements 135 each having a rectangular columnar shape and is formed of, for example, a metal which contains Cr (chromium), such as ferritic stainless steel. The cathode-side current collector 134 is in contact with the surface on a side opposite the electrolyte layer 112 of the cathode 114 and with the surface on a side toward the cathode 114 of the interconnector 150, thereby electrically connecting the cathode 114 and the interconnector 150. In the present embodiment, the cathode-side current collector 134 and the interconnector 150 are integrally formed as a unitary member. That is, a flat-plate-shape portion orthogonal to the vertical direction (Z-axis direction) of the unitary member functions as the interconnector 150, and a plurality of the current collector elements 135 protruding from the flat-plate-shape portion toward the cathode 114 collectively function as the cathode-side current collector 134. The cathode-side current collector 134 or a unitary member consisting of the cathode-side current collector 134 and the interconnector 150 is an example of the current collector. Also, the current collector elements 135 which constitute the cathode-side current collector 134 are collectively an example of the protrusions protruding toward the cathode 114.

As shown in FIGS. 2 and 3, the surface of the cathode-side current collector 134 is covered with an electrically conductive coat 136. The coat 136 is formed of a spinel oxide which contains at least one of Zn (zinc), Mn (manganese), Co (cobalt), and Cu (copper) (e.g., $Mn_{1.5}Co_{1.5}O_4$, $MnCo_2O_4$, $ZnCo_2O_4$, $ZnMnCoO_4$, or $CuMn_2O_4$). The coat 136 is formed on the surface of the cathode-side current collector 134 by a conventionally known method, such as spray coating, ink jet printing, spin coating, dip coating, plating, sputtering, or thermal spraying. As mentioned above, in the present embodiment, the cathode-side current collector 134 and the interconnector 150 are integrally formed as a unitary member. As a result, in actuality, a surface of the cathode-side current collector 134 serving as a boundary surface between the cathode-side current collector 134 and the interconnector 150 is not covered with the coat 136, whereas a surface of the interconnector 150 which faces at least the oxidizer gas flow channel (specifically, a surface of the interconnector 150 on a side toward the cathode 114, a surface of the interconnector 150 which faces the through hole 108 of the oxidizer gas supply manifold 161, a surface of the interconnector 150 which faces the through hole 108 of the oxidizer gas discharge manifold 162, etc.) is covered with the coat 136. In some cases, a chromic oxide film is formed as a result of thermal treatment on the cathode-side current collector 134; in this case, the coat 136 is not the chromic oxide film, but is a layer formed in such a manner as to cover the cathode-side current collector 134 on which the chromic oxide film is formed. In the following description, unless otherwise specified, the cathode-side current collector 134 (or the current collector element 135)

means "the cathode-side current collector 134 (or the current collector element 135) covered with the coat 136."

The cathode 114 and the cathode-side current collector 134 are bonded together by an electrically conductive bonding layer 138. Similar to the coat 136, the bonding layer 138 is formed of a spinel oxide which contains at least one of Zn, Mn, Co, and Cu (e.g., $Mn_{1.5}Co_{1.5}O_4$, $MnCo_2O_4$, $ZnCo_2O_4$, $ZnMnCoO_4$, or $CuMn_2O_4$). In the present embodiment, the coat 136 and the bonding layer 138 are formed of respective spinel oxides which contain the same main component elements. The main component elements mean metal elements used to form a spinel oxide. A spinel oxide is identified by performing X-ray diffraction and ultimate analysis. The bonding layer 138 is formed, for example, as follows: paste used to form the bonding layer is applied, by printing, to those portions of the surface of the cathode 114 which face distal end portions of the current collector elements 135 constituting the cathode-side current collector 134, followed by firing under predetermined conditions in a state in which the distal end portions of the current collector elements 135 are pressed against the applied paste. The bonding layer 138 electrically connects the cathode 114 and the cathode-side current collector 134. It is mentioned above that the cathode-side current collector 134 is in contact with the surface of the cathode 114; however, precisely, the bonding layer 138 intervenes between the cathode 114 and the cathode-side current collector 134 (covered with the coat 136).

A-2. Generation of Electricity in Fuel Cell Stack 100:

As shown in FIG. 2, when the oxidizer gas OG is supplied to the oxidizer gas supply manifold 161, the oxidizer gas OG is supplied from the oxidizer gas supply manifold 161 to the air chambers 166 through the oxidizer gas supply communication holes 132 of the electricity generation units 102. Also, as shown in FIG. 3, when the fuel gas FG is supplied to the fuel gas supply manifold 171, the fuel gas FG is supplied from the fuel gas supply manifold 171 to the fuel chambers 176 through the fuel gas supply communication holes 142 of the electricity generation units 102.

When the oxidizer gas OG is supplied to the air chamber 166 of each electricity generation unit 102, whereas the fuel gas FG is supplied to the fuel chamber 176 of each electricity generation unit 102, the single cell 110 generates electricity through the electrochemical reaction between the oxidizer gas OG and the fuel gas FG. In each electricity generation unit 102, the cathode 114 of the single cell 110 is electrically connected to one interconnector 150 through the cathode-side current collector 134 (as well as the coat 136 and the bonding layer 138), whereas the anode 116 is electrically connected to the other interconnector 150 through the anode-side current collector 144. Also, a plurality of the electricity generation units 102 contained in the fuel cell stack 100 are connected in series. Accordingly, electric energy generated in the electricity generation units 102 is output from the end plates 104 and 106 which function as output terminals of the fuel cell stack 100. Notably, in the SOFC, since electricity is generated at a relatively high temperature (e.g., 700° C. to 1,000° C.), the fuel cell stack 100 may be heated by a heater (not shown) from startup till the high temperature can be maintained by means of heat generated as a result of generation of electricity.

As shown in FIG. 2, the oxidizer offgas OOG (oxidizer gas not utilized for the electricity generating reaction in the electricity generation units 102) is discharged from the air chambers 166 to the outside of the fuel cell stack 100 through the oxidizer gas discharge communication holes 133 and the oxidizer gas discharge manifold 162. Also, as shown in FIG. 3, the fuel offgas OFG (fuel gas not utilized for the electricity generating reaction in the electricity generation units 102) is discharged from the fuel chambers 176 to the outside of the fuel cell stack 100 through the fuel gas discharge communication holes 143 and the fuel gas discharge manifold 172.

A-3. Detailed Structure of Cathode-Side Current Collector 134 and Bonding Layer 138:

As shown in FIGS. 2 and 3, in the sections, taken in parallel with the vertical direction, of the current collector elements 135 which constitute the cathode-side current collector 134, the bonding layer 138 is present in a region between the cathode 114 and a central portion of the surface (hereinafter, called the "bottom surface BF") facing the cathode 114 of each current collector element 135 and does not extend outward (in a direction orthogonal to the vertical direction) from the region. That is, the current collector element 135 has a covered portion PC covered with the bonding layer 138, and an exposed portion PE which is not covered with the bonding layer 138 to thereby be exposed from the bonding layer 138, and the exposed portion PE includes a corner portion CP of the current collector element 135. In other words, the corner portion CP of the current collector element 135 is not covered with the bonding layer 138. In a mode in which the bottom surface BF and a side surface LF are planes as shown in FIGS. 2 and 3, the corner portion CP of the current collector element 135 is a portion in the vicinity of the boundary between the bottom surface BF and the side surface LF. In the present embodiment, since the bonding layer 138 covers only a central portion of the bottom surface BF of the current collector element 135 and does not cover a peripheral portion of the bottom surface BF and does not cover the side surface LF as well, the corner portion CP of the current collector element 135 is not covered with the bonding layer 138.

In the present embodiment, in any section of the current collector element 135 taken in parallel with the vertical direction, similar to the sections shown in FIGS. 2 and 3, the corner portion CP of the current collector element 135 is not covered with the bonding layer 138. That is, as viewed from the cathode 114 side, the corner portion CP of the current collector element 135 is not covered with the bonding layer 138 along the entire perimeter thereof. FIGS. 2 and 3 show the structure of part of the current collector elements 135 which constitute the cathode-side current collector 134; however, in the present embodiment, similarly, with respect to all the current collector elements 135 which constitute the cathode-side current collector 134, the corner portion CP of the current collector element 135 is not covered with the bonding layer 138 along the entire perimeter thereof. Such a structure is implemented as follows: in manufacture of the fuel cell stack 100, paste used to form the bonding layer is applied, by means of printing, to the surface of the cathode 114 in regions corresponding to central portions of the bottom surfaces BF of the current collector elements 135 (not applied, by means of printing, to regions corresponding to peripheral portions of the bottom surfaces BF) in such a manner that when the applied bonding layer paste is pressed by the bottom surfaces BF of the current collector elements 135, the corner portions CP of the current collector elements 135 are not covered with the bonding layer paste.

Figure 6:
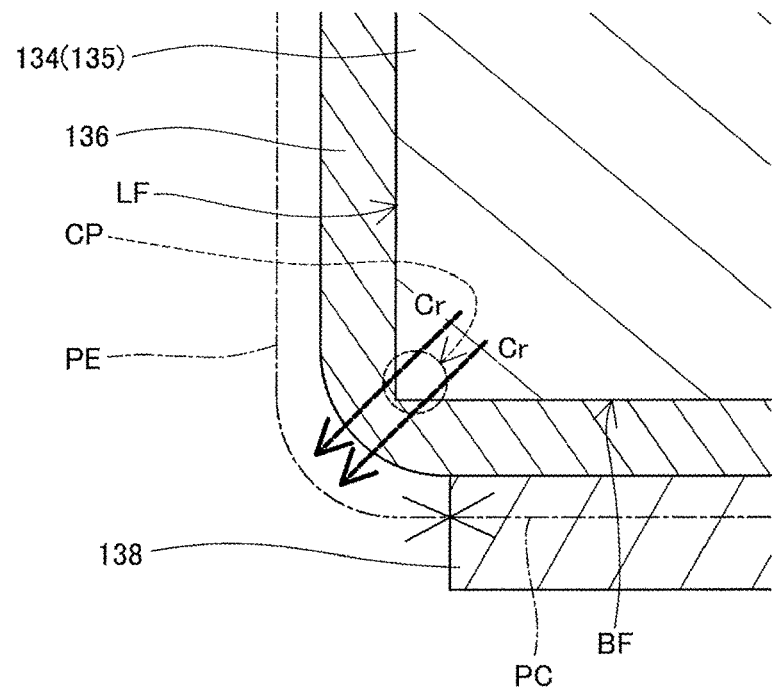
FIG. 6 Explanatory view showing the structure of a cathode-side current collector 134 and its vicinity.

As described above, in the fuel cell stack 100 of the present embodiment, in all sections, taken in parallel with the vertical direction, of each of the current collector elements 135 which constitute the cathode-side current collector 134, the current collector element 135 (covered with the coat 136) has the covered portion PC covered with the bonding layer 138, and the exposed portion PE which includes the corner portion CP of the current collector element 135 and is not covered with the bonding layer 138 to thereby be exposed from the bonding layer 138. That is, the corner portions CP of the current collector elements 135 are not covered with the respective bonding layers 138 along the entire perimeters thereof and thus are not in contact with the bonding layer 138 along the entire perimeters thereof. As shown in FIG. 6, since the corner portion CP of the current collector element 135 has a portion of the side surface LF as well as a portion of the bottom surface BF, the corner portion CP has a larger number of diffusion surfaces as compared with the other portions of the current collector element 135. Also, the coat 136 which covers the current collector element 135 is apt to reduce in thickness at the corner portion CP. Particularly, this tendency is marked in the case of forming the coat 136 by spray coating, ink jet printing, spin coating, dip coating, plating, sputtering, thermal spraying, or the like. As a result, as indicated by the arrows in FIG. 6, Cr is apt to be emitted and diffused at the corner portion CP of the current collector element 135 as compared with the other portion of the current collector element 135. When Cr emitted from the current collector element 135 enters the bonding layer 138, unfavorably, the emitted Cr reacts with a component of the bonding layer 138 to thereby cause deterioration in electric conductivity of the bonding layer 138, or passes through the bonding layer 138 to reach the interface with the cathode 114, which may cause a phenomenon called "Cr poisoning of cathode" in which the electrode reaction rate deteriorates in the cathode 114.

In the present embodiment, since the corner portions CP of the current collector elements 135 are not covered with the respective bonding layers 138, as compared with a structure in which the corner portions CP of the current collector elements 135 are covered with the respective bonding layers 138, even though Cr is emitted from the corner portions CP of the current collector elements 135 through the coat 136, entry of the emitted Cr into the bonding layers 138 is restrained, whereby deterioration in electric conductivity of the bonding layers 138 and in electrode reaction rate of the cathodes 114 can be effectively restrained.

Cr emitted from the corner portion CP of the current collector element 135 and diffused into the air chamber 166 may enter the bonding layer 138 and may adhere to the surface of the cathode 114; however, generally, since a flow of oxidizer gas exists within the air chamber 166, the possibility that Cr diffused within the air chamber 166 enters the bonding layer 138 and adheres to the surface of the cathode 114 is low as compared with a structure in which the corner portion CP of the current collector element 135 is in contact with the bonding layer 138 and the cathode 114. Even if Cr adheres to a surface of the cathode 114, the possibility of adhesion of Cr to the surface of that portion of the cathode 114 which is covered with the bonding layer 138 and serves as an electrically conductive path is low; therefore, the possibility of deterioration in electrode reaction rate of the cathode 114 is low.

In the present embodiment, since the bonding layer 138 is formed of a spinel oxide, even though Cr emitted from the corner portion CP of the current collector element 135 enters the bonding layer 138, an increase in resistance caused by Cr can be restrained to a low level as compared with the case where the bonding layer 138 is formed of another material such as a perovskite-type oxide, whereby deterioration in electric conductivity of the bonding layer 138 can be more effectively restrained.

In the present embodiment, the bonding layer 138 is formed of a spinel oxide which contains at least one of Zn, Mn, Co, and Cu. Since a spinel oxide which contains at least one of Zn, Mn, Co, and Cu can maintain a spinel structure for a long period of time even in a relatively high temperature environment, as a result of the bonding layer 138 being formed of such a spinel oxide, the effect of restraining deterioration in electric conductivity of the bonding layer 138 can be maintained for a long period of time.

B. Second Embodiment

Figure 7:
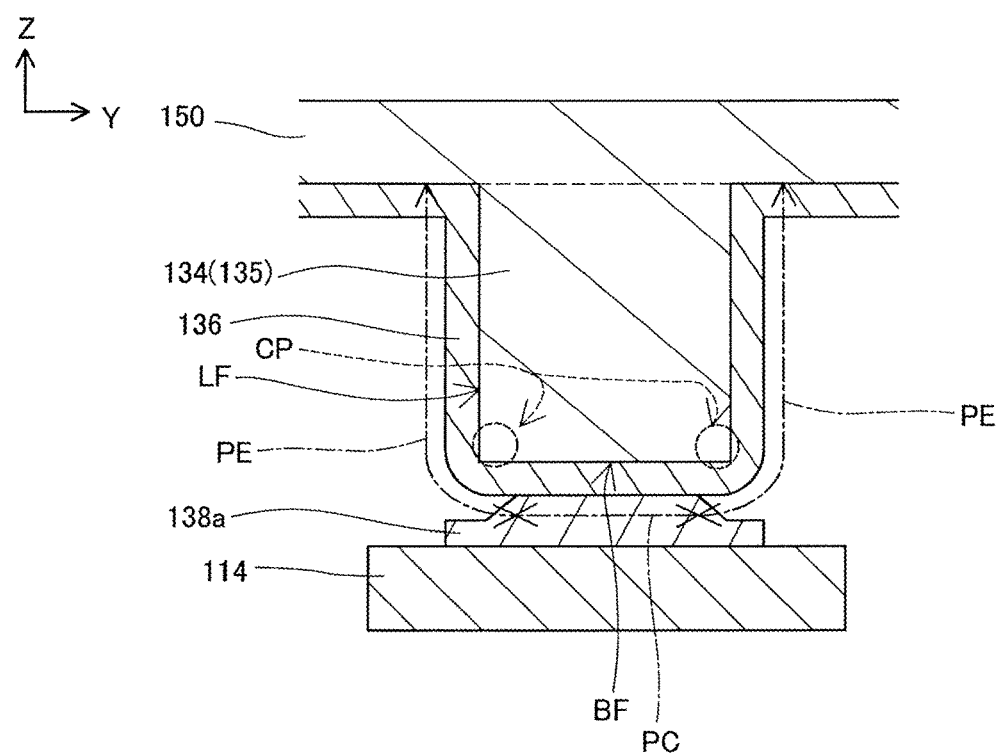
FIG. 7 Explanatory view showing the structure of the cathode-side current collector 134 and its vicinity in a second embodiment.

FIG. 7 is an explanatory view showing the structure of the cathode-side current collector 134 and its vicinity in a second embodiment. FIG. 7 shows a section of the cathode-side current collector 134 and its vicinity taken in parallel with the Z-axis and the Y-axis. Structural features of the second embodiment identical with those of the above-described first embodiment are denoted by the same reference numerals as those of the first embodiment, and repeated description thereof is omitted.

The second embodiment differs from the first embodiment in the structure of a bonding layer 138a. Specifically, in the second embodiment, the contact area of the bonding layer 138a with the cathode 114 is greater than the contact area of the bonding layer 138a with the current collector element 135 (covered with the coat 136). Accordingly, the contact area between the bonding layer 138a and the cathode 114 can be increased, whereby deterioration in electric conductivity of the bonding layer 138a can be more effectively restrained. Also, in the second embodiment, a reaction interface of the cathode 114 (a contact interface with the bonding layer 138a) which receives electrons is increased, whereby electricity generation performance can be improved.

In the second embodiment also, similar to the first embodiment, in all sections, taken in parallel with the vertical direction, of each of the current collector elements 135 which constitute the cathode-side current collector 134, the current collector element 135 has the covered portion PC covered with the bonding layer 138a, and the exposed portion PE which includes the corner portion CP of the current collector element 135 and is not covered with the bonding layer 138a to thereby be exposed from the bonding layer 138a. That is, the corner portions CP of the current collector elements 135 are not covered with the respective bonding layers 138a along the entire perimeters thereof. As a result, the second embodiment also yields effects similar to those of the first embodiment described above.

C. Third Embodiment

Figure 8:
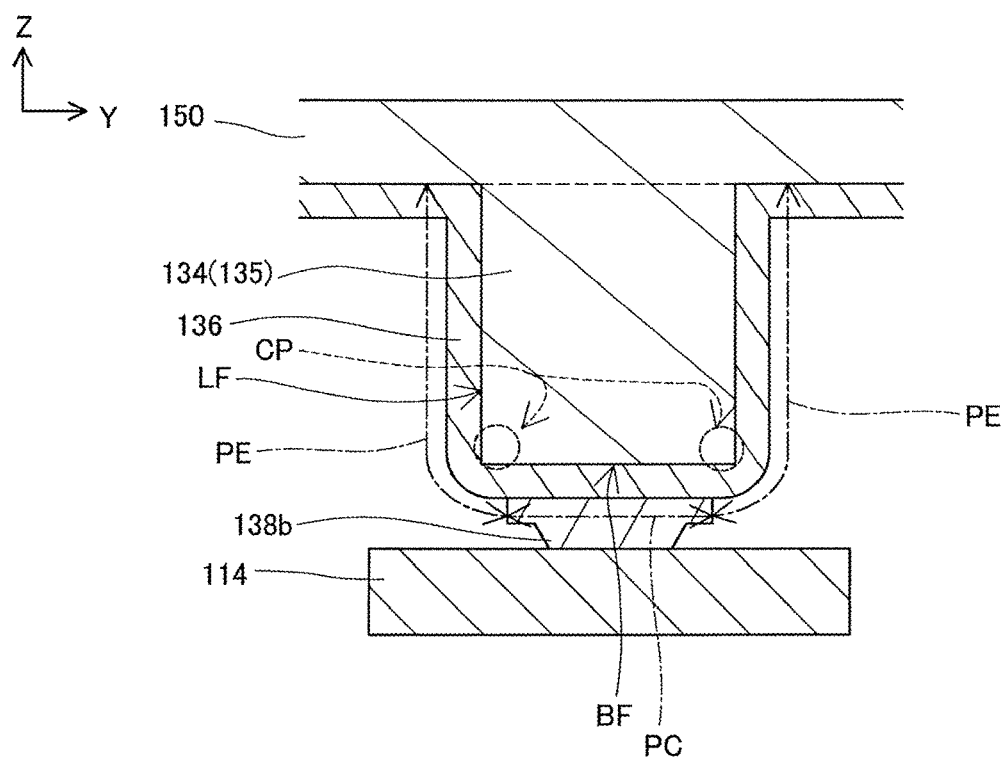
FIG. 8 Explanatory view showing the structure of the cathode-side current collector 134 and its vicinity in a third embodiment.

FIG. 8 is an explanatory view showing the structure of the cathode-side current collector 134 and its vicinity in a third embodiment. FIG. 8 shows a section of the cathode-side current collector 134 and its vicinity taken in parallel with the Z-axis and the Y-axis. Structural features of the third embodiment identical with those of the above-described first embodiment are denoted by the same reference numerals as those of the first embodiment, and repeated description thereof is omitted.

The third embodiment differs from the first and second embodiments in the structure of a bonding layer 138b. Specifically, in the third embodiment, the contact area of the bonding layer 138b with the cathode 114 is smaller than the contact area of the bonding layer 138b with the current collector element 135 (covered with the coat 136). Accordingly, the bonding layer 138b's hindrance to gas diffusion into the cathode 114 can be restrained, whereby deterioration in electricity generation performance can be restrained.

In the third embodiment also, similar to the first embodiment, in all sections, taken in parallel with the vertical direction, of each of the current collector elements 135 which constitute the cathode-side current collector 134, the current collector element 135 has the covered portion PC covered with the bonding layer 138b, and the exposed portion PE which includes the corner portion CP of the current collector element 135 and is not covered with the bonding layer 138b to thereby be exposed from the bonding layer 138b. That is, the corner portions CP of the current collector elements 135 are not covered with the respective bonding layers 138b along the entire perimeters thereof. As a result, the third embodiment also yields effects similar to those of the first embodiment described above.

D. Modifications

The technique disclosed in the present specification is not limited to the above embodiments, but may be modified to various other forms without departing from the gist thereof; for example, the following modifications are possible.

Figure 9:
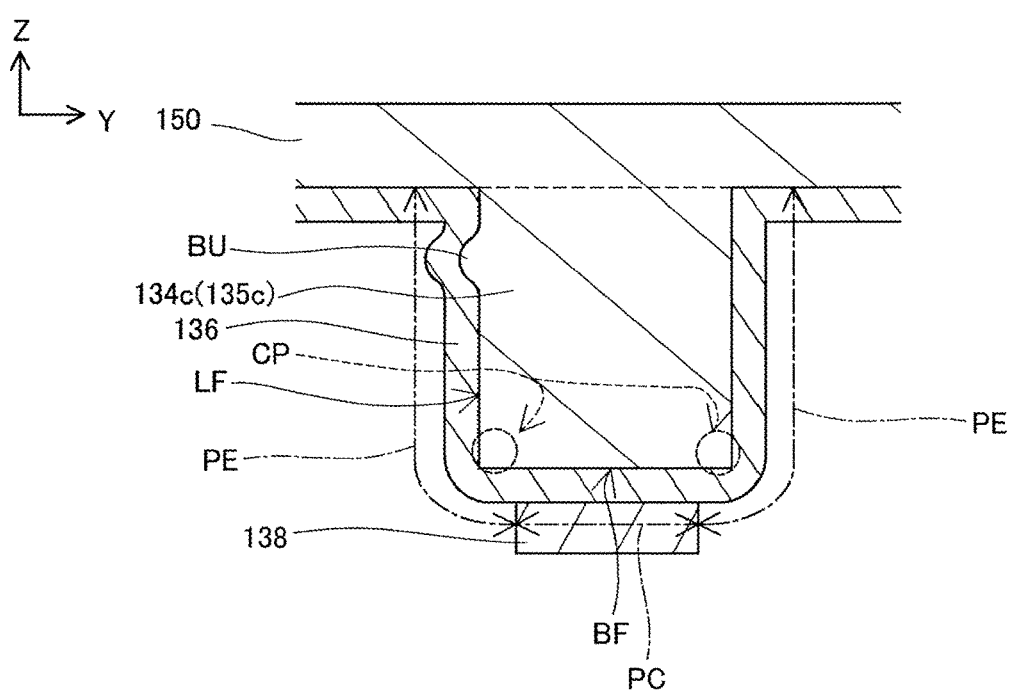
FIG. 9 Explanatory view showing the structure of a cathode-side current collector 134*c* and its vicinity in a modification.

In the above embodiments, as shown in FIGS. 2 and 3, the bottom surface BF and the side surface LF of each of the current collector elements 135 constituting the cathode-side current collector 134 are each a single flat surface, but are not necessarily assume such a form. FIG. 9 is an explanatory view showing the structure of a cathode-side current collector 134c and its vicinity in a modification. FIG. 9 shows a section of the cathode-side current collector 134c and its vicinity taken in parallel with the Z-axis and the Y-axis. The same also applies to FIGS. 10 to 13 to be described later. In the modification shown in FIG. 9, a bump BU is present on the side surface LF of each of current collector elements 135c constituting the cathode-side current collector 134c. In the present modification also, the corner portion CP of the current collector element 135c is a portion in the vicinity of the boundary between the bottom surface BF and the side surface LF. In the structure shown in FIG. 9, since the bonding layer 138 covers only a central portion of the bottom surface BF of the current collector element 135c and does not cover a peripheral portion of the bottom surface BF and does not cover the side surface LF as well, the current collector element 135c has the covered portion PC covered with the bonding layer 138, and the exposed portion PE which includes the corner portion CP of the current collector element 135c and is not covered with the bonding layer 138 to thereby be exposed from the bonding layer 138.

Figure 10:
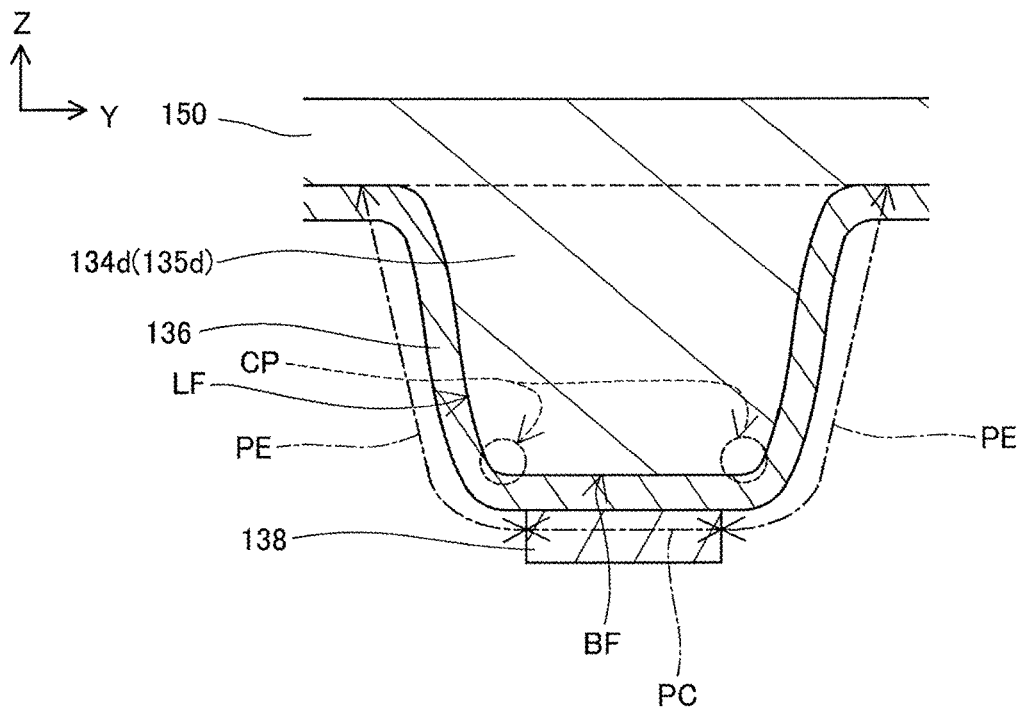
FIG. 10 Explanatory view showing the structure of a cathode-side current collector 134*d* and its vicinity in another modification.

FIG. 10 is an explanatory view showing the structure of a cathode-side current collector 134d and its vicinity in another modification. In the modification shown in FIG. 10, the side surface LF of each of current collector elements 135d constituting the cathode-side current collector 134d is a curved surface rather than a flat surface. A portion of the side surface LF of the current collector element 135d in the vicinity of the boundary between the side surface LF and the bottom surface BF is an outwardly convex curved surface. In the present modification also, the corner portion CP of the current collector element 135d is a portion of the current collector element 135d in the vicinity of the boundary between the bottom surface BF and the side surface LF. In the structure shown in FIG. 10, since the bonding layer 138 covers only a central portion of the bottom surface BF of the current collector element 135d and does not cover a peripheral portion of the bottom surface BF and does not cover the side surface LF as well, the current collector element 135d has the covered portion PC covered with the bonding layer 138, and the exposed portion PE which includes the corner portion CP of the current collector element 135d and is not covered with the bonding layer 138 to thereby be exposed from the bonding layer 138.

Figure 11:
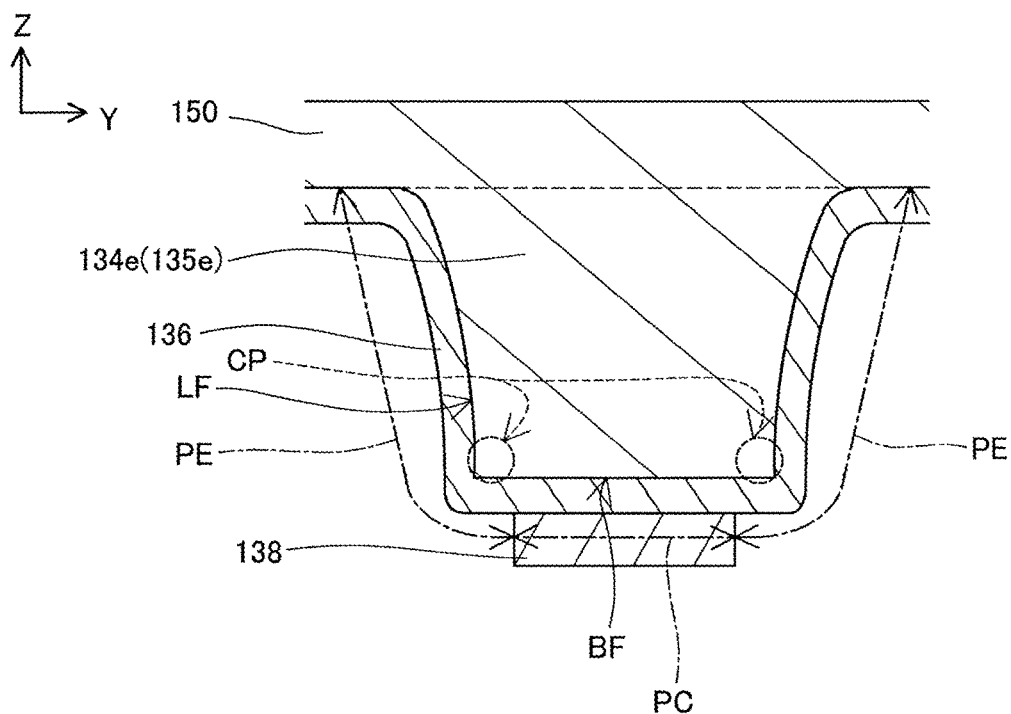
FIG. 11 Explanatory view showing the structure of a cathode-side current collector 134*e* and its vicinity in a further modification.

FIG. 11 is an explanatory view showing the structure of a cathode-side current collector 134e and its vicinity in a further modification. In the modification shown in FIG. 11, the side surface LF of each of current collector elements 135e constituting the cathode-side current collector 134e is a curved surface rather than a flat surface. A portion of the side surface LF of the current collector element 135e in the vicinity of the boundary between the side surface LF and the bottom surface BF is an inwardly convex curved surface. In the present modification also, the corner portion CP of the current collector element 135e is a portion of the current collector element 135e in the vicinity of the boundary between the bottom surface BF and the side surface LF. In the structure shown in FIG. 11, since the bonding layer 138 covers only a central portion of the bottom surface BF of the current collector element 135e and does not cover a peripheral portion of the bottom surface BF and does not cover the side surface LF as well, the current collector element 135e has the covered portion PC covered with the bonding layer 138, and the exposed portion PE which includes the corner portion CP of the current collector element 135e and is not covered with the bonding layer 138 to thereby be exposed from the bonding layer 138.

Figure 12:
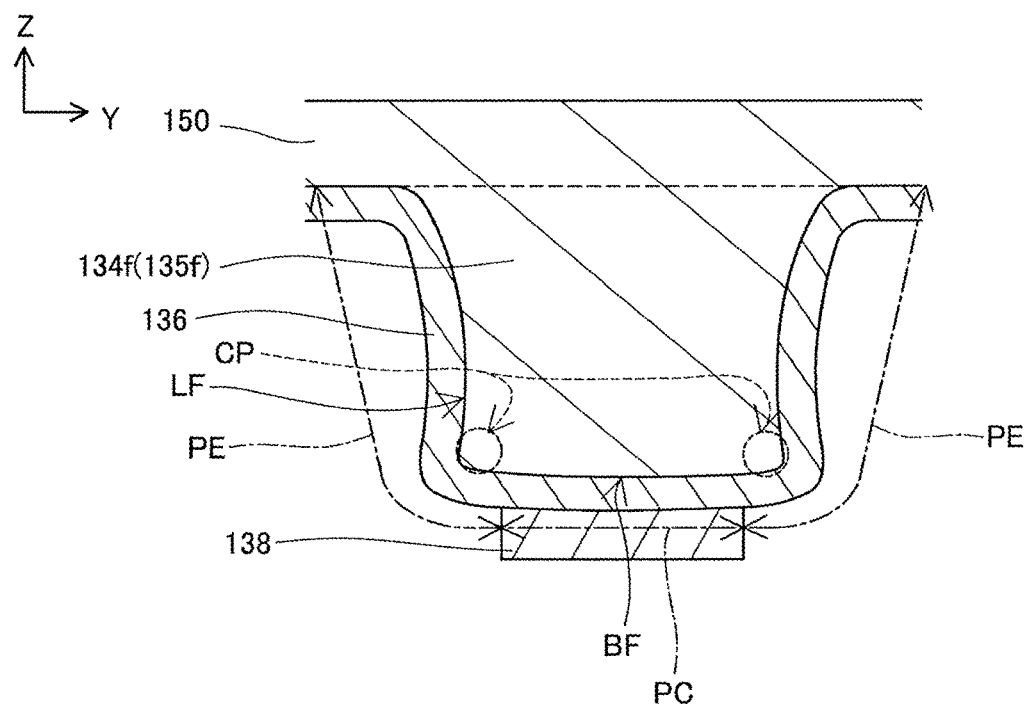
FIG. 12 Explanatory view showing the structure of a cathode-side current collector 134*f* and its vicinity in a still further modification.

FIG. 12 is an explanatory view showing the structure of a cathode-side current collector 134f and its vicinity in a still further modification. In the modification shown in FIG. 12, the side surface LF and the bottom surface BF of each of current collector elements 135f constituting the cathode-side current collector 134f are curved surfaces rather than planes. A portion of the side surface LF of the current collector element 135f in the vicinity of the boundary between the side surface LF and the bottom surface BF is an inwardly convex curved surface. Also, a portion of the bottom surface BF of the current collector element 135f in the vicinity of the boundary between the bottom surface BF and the side surface LF is an outwardly convex curved surface. In the present modification also, the corner portion CP of the current collector element 135f is a portion of the current collector element 135f in the vicinity of the boundary between the bottom surface BF and the side surface LF. In the structure shown in FIG. 12, since the bonding layer 138 covers only a central portion of the bottom surface BF of the current collector element 135f and does not cover a peripheral portion of the bottom surface BF and does not cover the side surface LF as well, the current collector element 135f has the covered portion PC covered with the bonding layer 138, and the exposed portion PE which includes the corner portion CP of the current collector element 135f and is not covered with the bonding layer 138 to thereby be exposed from the bonding layer 138.

Figure 13:
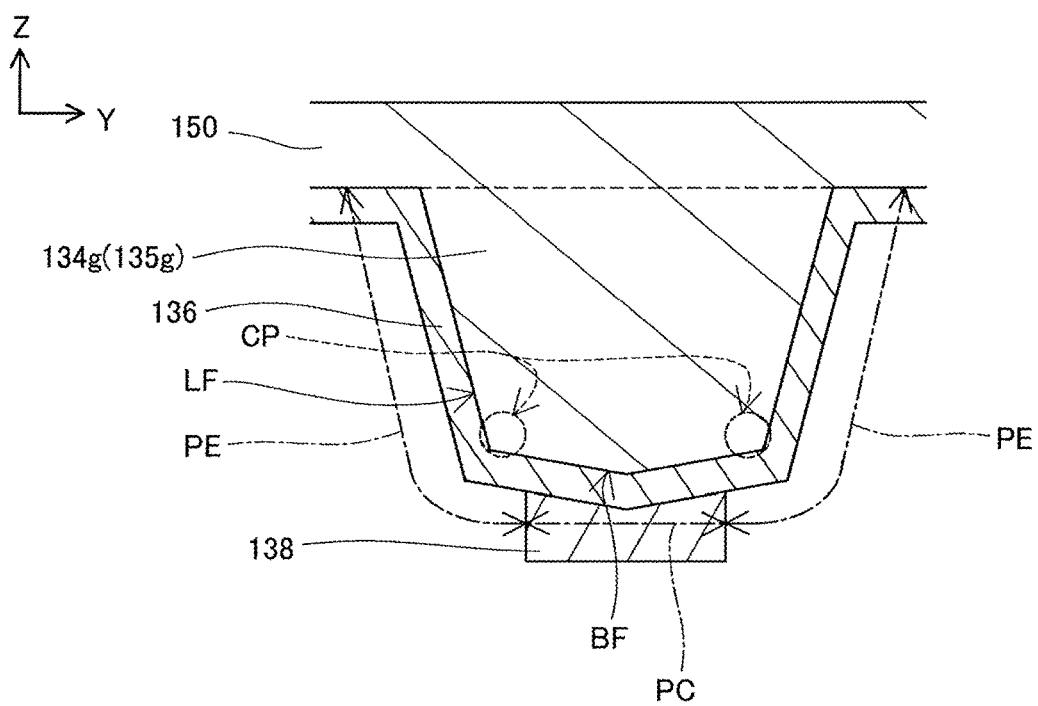
FIG. 13 Explanatory view showing the structure of a cathode-side current collector 134*g* and its vicinity in a yet another modification.

FIG. 13 is an explanatory view showing the structure of a cathode-side current collector 134g and its vicinity in a yet another modification. In the modification shown in FIG. 13, the bottom surface BF of each of current collector elements 135g constituting the cathode-side current collector 134g is a curved surface rather than a flat surface. The bottom surface BF of the current collector element 135g is composed of a single flat or curved surface or a plurality of flat or curved surfaces and assumes a form of a downwardly convex surface as a whole. In the present modification also, the corner portion CP of the current collector element 135g is a portion of the current collector element 135g in the vicinity of the boundary between the bottom surface BF and the side surface LF. In the structure shown in FIG. 13, since the bonding layer 138 covers only a central portion of the bottom surface BF of the current collector element 135g and does not cover a peripheral portion of the bottom surface BF and does not cover the side surface LF as well, the current collector element 135g has the covered portion PC covered with the bonding layer 138, and the exposed portion PE which includes the corner portion CP of the current collector element 135g and is not covered with the bonding layer 138 to thereby be exposed from the bonding layer 138.

Figure 14:
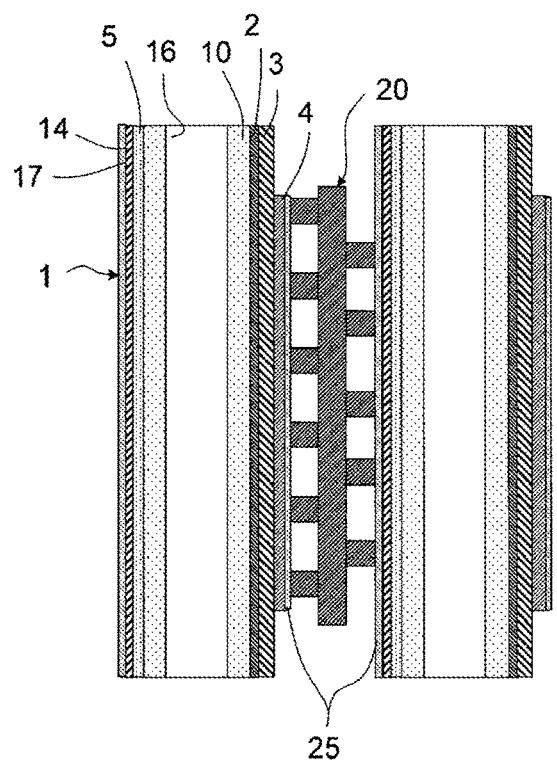
FIG. 14 Explanatory view schematically showing the structure of a fuel cell stack in another modification.
Figure 15:
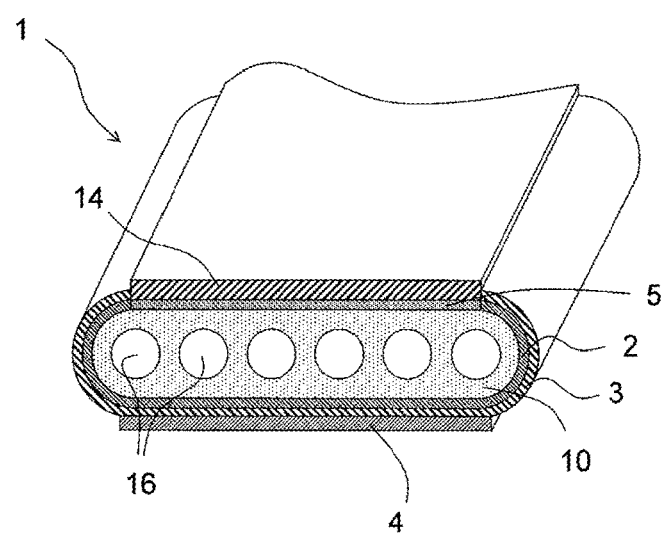
FIG. 15 Explanatory view schematically showing the structure of a fuel cell 1 of the fuel cell stack in the another modification.

In the above embodiments, the fuel cell stack 100 has a structure in which a plurality of the flat electricity generation units 102 are stacked. However, the present invention can be similarly applied to other structures, for example, a structure in which a plurality of substantially cylindrical single fuel cells are connected in series as described in Japanese Patent Application Laid-Open (kokai) No. 2008-59797. FIG. 14 is an explanatory view schematically showing the structure of a fuel cell stack in another modification, and FIG. 15 is an explanatory view schematically showing the structure of a fuel cell 1 of the fuel cell stack in the another modification. As shown in FIGS. 14 and 15, the fuel cell stack in the present modification includes a plurality of hollow flat fuel cells 1 and current collectors 20. The fuel cell 1 includes a hollow flat-plate-like support substrate 10, a porous anode 2 provided around the hollow flat-plate-like support substrate 10, a dense electrolyte layer 3, a porous cathode 4, a dense interconnector 5, and cathode material layer 14. The support substrate 10 has a plurality of fuel gas channels 16 extending therethrough in a direction (a cell length direction) intersecting with the stacking direction of the fuel cells 1. The current collector 20 is joined to the cathode 4 of one fuel cell 1 by a bonding layer 25 and to the cathode material layer 14 of the other adjacent fuel cell 1 by the bonding layer 25, whereby a plurality of the fuel cells 1 are electrically connected in series. Oxidizer gas is supplied to the outside of the cathodes 4; fuel gas is supplied into the fuel gas channels 16 within the support substrates 10; and the fuel cell stack is heated to a predetermined operating temperature, whereby the fuel cell stack generates electricity.

Figure 16:
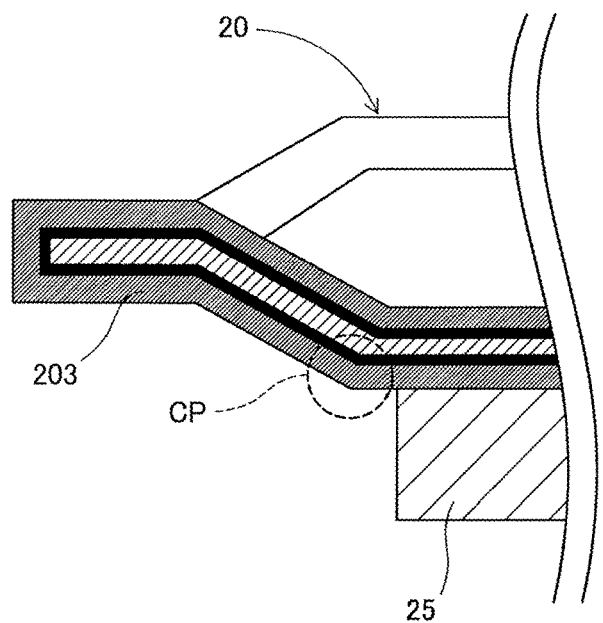
FIG. 16 Explanatory view showing the detailed structure of a current collector 20 in the fuel cell stack of the another modification shown in FIGS. 14 and 15.
Figure 17:
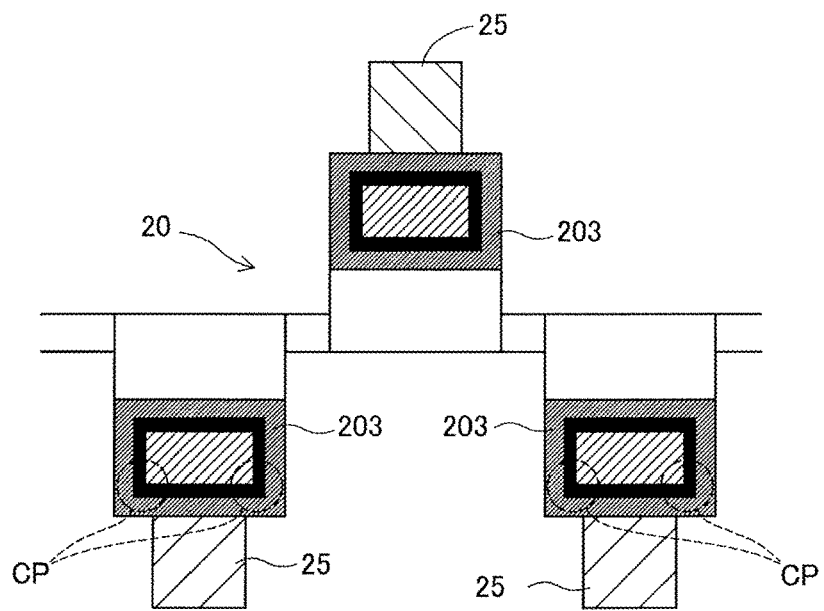
FIG. 17 Explanatory view showing the detailed structure of the current collector 20 in the fuel cell stack of the another modification shown in FIGS. 14 and 15.

FIGS. 16 and 17 are explanatory views showing the detailed structure of the current collector 20 in the fuel cell stack of the another modification shown in FIGS. 14 and 15. In FIGS. 16 and 17, the cathode 4 of the fuel cell 1 is to be disposed under the current collector 20. The current collector 20 is formed of, for example, a metal which contains Cr and is covered with a coat 203 whose surface is electrically conductive. As shown in FIGS. 16 and 17, the corner portion CP of a protrusion of the current collector 20 protruding toward the cathode 4 is not covered with the bonding layer 25 to thereby be exposed from the bonding layer 25. As a result, as compared with a structure in which the corner portions CP of the protrusions of the current collectors 20 are covered with the respective bonding layers 25, even though Cr is emitted from the corner portions CP of the protrusions of the current collectors 20 through the coat 203, entry of the emitted Cr into the bonding layers 25 is restrained, whereby deterioration in electric conductivity of the bonding layers 25 and in electrode reaction rate of the cathodes 114 can be effectively restrained.

The above embodiments refer to SOFC for generating electricity by utilizing the electrochemical reaction between hydrogen contained in fuel gas and oxygen contained in oxidizer gas; however, the present invention is also applicable to an electrolysis cell unit which is the smallest unit of a solid oxide electrolysis cell (SOEC) for generating hydrogen by utilizing the electrolysis of water, and to an electrolysis cell stack having a plurality of electrolysis cell units. Since the structure of the electrolysis cell stack is publicly known as described in, for example, Japanese Patent Application Laid-Open (kokai) No. 2014-207120, detailed description thereof is omitted, but schematically, the electrolysis cell stack has a structure similar to that of the fuel cell stack 100 in the above embodiments. That is, the fuel cell stack 100 in the above embodiments may be read as "electrolysis cell stack," and the electricity generation unit 102 may be read as "electrolysis cell unit." However, in operation of the electrolysis cell stack, voltage is applied between the cathode 114 and the anode 116 such that the cathode 114 is a positive electrode (anode), whereas the anode 116 is a negative electrode (cathode), and water vapor is supplied as material gas through the through hole 108. As a result, the electrolysis of water occurs in the electrolysis cell units, whereby hydrogen gas is generated in the fuel chambers 176, and hydrogen is discharged to the outside of the electrolysis cell stack through the through hole 108. Even in the electrolysis cell unit and the electrolysis cell stack having the above structures, similar to the above embodiments, through employment of a structure in which in all sections, taken in parallel with the vertical direction, of each of the current collector elements 135 constituting the cathode-side current collector 134, the corner portion CP of the current collector element 135 is not covered with the bonding layer 138, entry of Cr into the bonding layers 138 is restrained, whereby deterioration in electric conductivity of the bonding layers 138 and in electrode reaction rate of the cathodes 114 can be restrained.

In the above embodiments (or the above modifications; the same also applies in the following description), with respect to all the electricity generation units 102 (or all the electrolysis cell units; the same also applies in the following description) contained in the fuel cell stack 100 (or the electrolysis cell stack; the same also applies in the following description), in all sections, taken in parallel with the vertical direction, of each of the current collector elements 135 constituting the cathode-side current collector 134, the corner portion CP is not covered with the bonding layer 138. However, if at least one electricity generation unit 102 contained in the fuel cell stack 100 has such a structure, in the electricity generation unit(s) 102 concerned, entry of Cr into the bonding layers 138 is restrained, whereby deterioration in electric conductivity of the bonding layers 138 and in electrode reaction rate of the cathode(s) 114 can be restrained. Also, if at least one of the current collector elements 135 constituting the cathode-side current collector 134 has such a structure, in the region(s) of the current collector element(s) 135 concerned, entry of Cr into the bonding layers 138 is restrained, whereby deterioration in electric conductivity of the bonding layers 138 and in electrode reaction rate of the cathodes 114 can be restrained. Also, if in at least one section of each current collector element 135 taken in parallel with the vertical direction, the corner portion CP is not covered with the bonding layer 138, as compared with a structure in which in all sections of each current collector element 135 taken in parallel with the vertical direction, the corner portion CP is covered with the bonding layer 138, entry of Cr into the bonding layers 138 is restrained, whereby deterioration in electric conductivity of the bonding layers 138 and in electrode reaction rate of the cathodes 114 can be restrained.

In the above embodiments, the coat 136 and the bonding layer 138 are formed of respective spinel oxides which contain the same main component. However, the coat 136 and the bonding layer 138 may be formed of respective spinel oxides which differ in the main component. Also, in the above embodiments, the coat 136 and the bonding layer 138 are formed of respective spinel oxides which contain at least one of Zn, Mn, Co, and Cu. However, the coat 136 and the bonding layer 138 may be formed of respective spinel oxides which do not contain these elements. Also, in the above embodiments, the coat 136 and the bonding layer 138 are formed of respective spinel oxides. However, the coat 136 and the bonding layer 138 may be formed of another material such as a perovskite-type oxide.

In the above embodiments, the electrolyte layer 112 is formed of a solid oxide. However, the electrolyte layer 112 may contain other substances in addition to a solid oxide. Also, in the above embodiments, materials used to form the members are provided merely by way of example. Other materials may be used to form the members. For example, in the above embodiment, the cathode-side current collector 134 is formed of a metal which contains Cr; however, the cathode-side current collector 134 may be formed of another material so long as the cathode-side current collector 134 is covered with the coat 136. Also, the shape of each current collector element 135 of the cathode-side current collector 134 is not limited to a rectangular columnar shape, but may be another shape so long as the shape is such that each current collector element 135 protrudes toward the cathode 114 from the interconnector 150 side.

In the above embodiments, a reaction preventive layer which contains ceria, for example, may be provided between the electrolyte layer 112 and the cathode 114 for restraining an increase in the electric resistance between the electrolyte layer 112 and the cathode 114, which would otherwise result from reaction between zirconium, etc., contained in the electrolyte layer 112 and strontium, etc., contained in the cathode 114. Also, in the above embodiments, the cathode-side current collector 134 and the adjacent interconnector 150 may be formed as separate members. The anode-side current collector 144 may have a structure similar to that of the cathode-side current collector 134, and the anode-side current collector 144 and the adjacent interconnector 150 may be integrally formed as a unitary member. The anode-side frame 140 rather than the cathode-side frame 130 may be an insulator. Also, the cathode-side frame 130 and the anode-side frame 140 may have a multilayer structure.

In the above embodiments, the end plates 104 and 106 function as output terminals. However, electrically conductive plates disposed respectively between the end plate 104 and the electricity generation unit 102 and between the end plate 106 and the electricity generation unit 102 may function as output terminals. Also, in the above embodiment, spaces between the outer circumferential surfaces of shaft portions of the bolts 22 and the inner circumferential surfaces of the through holes 108 are utilized as manifolds. However, axial holes may be formed in the bolts 22 for use as the manifolds, or the manifolds may be provided separately from the through holes 108 into which the bolts 22 are inserted.

DESCRIPTION OF REFERENCE NUMERALS

1: fuel cell; 2: anode; 3: electrolyte layer; 4: cathode; 5: interconnector; 10: support substrate; 14: cathode material layer; 16: fuel gas channel; 20: current collector; 22: bolt; 24: nut; 25: bonding layer; 100: fuel cell stack; 102: fuel cell electricity generation unit; 104: end plate; 106: end plate; 108: through hole; 110: single cell; 112: electrolyte layer; 114: cathode; 116: anode; 120: separator; 121: through hole; 124: bonding member; 130: cathode-side frame; 131: through hole; 132: oxidizer gas supply communication hole; 133: oxidizer gas discharge communication hole; 134: cathode-side current collector; 135: current collector element; 136: coat; 138: bonding layer; 140: anode-side frame; 141: through hole; 142: fuel gas supply communication hole; 143: fuel gas discharge communication hole; 144: anode-side current collector; 145: electrode facing portion; 146: interconnector facing portion; 147: connection portion; 149: spacer; 150: interconnector; 161: oxidizer gas supply manifold; 162: oxidizer gas discharge manifold; 166: air chamber; 171: fuel gas supply manifold; 172: fuel gas discharge manifold; 176: fuel chamber; and 203: coat.

The invention claimed is:

1. An electrochemical reaction unit comprising:
a single cell including an electrolyte layer containing solid oxide, and a cathode and an anode which face each other in a first direction with the electrolyte layer intervening therebetween;
a current collector disposed on a cathode side of the single cell and having a protrusion protruding toward the cathode;
an electrically conductive coat covering a surface of the current collector including the protrusion; and
an electrically conductive bonding layer bonding the cathode and the protrusion covered with the coat at a distal end portion of the protrusion;
the electrochemical reaction unit being characterized in that in at least one section of the protrusion taken in parallel with the first direction, the protrusion covered with the coat has a covered portion covered with the bonding layer and an exposed portion exposed from the bonding layer, the exposed portion including a corner portion of the distal end portion of the protrusion covered with the coat.

2. An electrochemical reaction unit according to claim 1, wherein respective sections of the protrusion taken in parallel with the first direction include sections where the protrusion covered with the coat has the covered portion and sections where the protrusion covered with the coat has the exposed portion.

3. An electrochemical reaction unit according to claim 2, wherein
the current collector has a plurality of the protrusions, and respective sections of each of the plurality of protrusions taken in parallel with the first direction; include sections where the protrusion covered with the coat has the covered portion and sections where the protrusion covered with the coat has the exposed portion.

4. An electrochemical reaction unit according to claim 1, wherein a contact area of the bonding layer with the cathode is smaller than a contact area of the bonding layer with the protrusion covered with the coat.

5. An electrochemical reaction unit according to claim 1, wherein a contact area of the bonding layer with the cathode is greater than a contact area of the bonding layer with the protrusion covered with the coat.

6. An electrochemical reaction unit according to claim 1, wherein the bonding layer is formed of a spinel oxide.

7. An electrochemical reaction unit according to claim 6, wherein the bonding layer is formed of a spinel oxide which contains at least one of Zn, Mn, Co, and Cu.

8. An electrochemical reaction unit according to claim 1, wherein the electrolyte layer, the cathode, and the anode have a flat-plate shape.

9. An electrochemical reaction unit according to claim 1, wherein the electrochemical reaction unit is a fuel cell electricity generation unit for generating electricity.

10. A fuel cell stack comprising a plurality of fuel cell electricity generation units, wherein at least one of the plurality of fuel cell electricity generation units is an electrochemical reaction unit according to claim 9.

* * * * *